United States Patent [19]

Koyayashi et al.

[11] Patent Number: 5,055,564
[45] Date of Patent: Oct. 8, 1991

[54] MODIFIED CRYSTALLINE MONOAZO LAKE PIGMENT

[75] Inventors: Nagatoshi Koyayashi; Hirohito Ando, both of Ibaraki, Japan

[73] Assignee: Dainippon Ink and Chemicals, Inc., Tokyo, Japan

[21] Appl. No.: 245,187

[22] Filed: Sep. 15, 1988

[51] Int. Cl.$^5$ .................. C09B 67/24; C09B 67/48; C09B 11/02; D06P 1/44

[52] U.S. Cl. .................. 534/575; 534/573; 534/588; 534/874; 106/23

[58] Field of Search .................. 534/575, 874

[56] References Cited

U.S. PATENT DOCUMENTS

| | | | |
|---|---|---|---|
| 2,453,490 | 11/1948 | Callaway et al. | 534/575 |
| 2,770,629 | 11/1956 | Eastes | 548/141 |
| 2,844,484 | 7/1958 | Reidinger et al. | 546/49 |
| 2,844,485 | 7/1985 | Struve et al. | 546/49 |
| 2,844,581 | 7/1958 | Manger et al. | 546/49 |
| 3,160,635 | 12/1964 | Knudson et al. | 548/141 |
| 3,264,300 | 8/1966 | Kelly et al. | 545/56 |
| 3,591,576 | 7/1971 | Haubrich | 534/874 |
| 3,927,026 | 12/1975 | Brach et al. | 540/139 |
| 3,928,315 | 12/1975 | Ribka | 534/575 |
| 4,014,866 | 3/1977 | Henning | 534/575 |
| 4,248,635 | 2/1981 | Henning et al. | |
| 4,719,292 | 1/1988 | Schui et al. | 534/575 |

FOREIGN PATENT DOCUMENTS

| | | |
|---|---|---|
| 0272697 | 6/1988 | European Pat. Off. |
| 584578 | 9/1933 | Fed. Rep. of Germany |
| 2510129 | 1/1983 | France .................. 534/575 |
| 55-84364 | 6/1980 | Japan .................. 534/575 |
| 63-225667 | 9/1988 | Japan |
| 63-225668 | 9/1988 | Japan |

OTHER PUBLICATIONS

Colour Index, 3rd Edition, vol. 4, p. 4085, No. 15850:2 (1971).
Kobayashi et al, Chemical Abstracts, vol. 110, Abstract No. 775045q, (1989).
Saito et al, Index Chemical, vol. 28, No. 89798 (1968).
Tanaka et al, Chemical Abstracts, vol. 67, Abstract No. 55141k (1967).
Chemical Abstracts, vol. 106, No. 8, Feb. 1987, No. 517946 Muzik et al.

Primary Examiner—Mary C. Lee
Assistant Examiner—Fiona T. Powers
Attorney, Agent, or Firm—Armstrong, Nikaido, Marmelstein, Kubovcik & Murray

[57] ABSTRACT

A monoazo lake pigment for use in inks and paints of the formula (I):

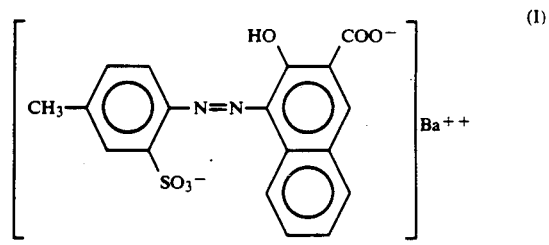

whose X-ray diffraction pattern shows a high diffraction intensity at a diffraction angle ($2\theta \pm 0.2°$; Cu-K$_\alpha$) of 5.0°, moderate diffraction intensity at 25.0° and relatively low diffraction intensities at 14.8°, 19.5°.

4 Claims, 2 Drawing Sheets

MODIFIED CRYSTALLINE MONOAZO LAKE PIGMENT

BACKGROUND OF THE INVENTION

1. Field of the Invention

This invention relates to a novel red monoazo lake pigment which is excellent in various properties including brightness, color strength, gloss, fastness to water and fastness to heat and highly useful in, for example, printing inks, paints, plastics and stationery products.

2. Description of the Prior Art

A conventional monoazo lake pigment of the following formula (I):

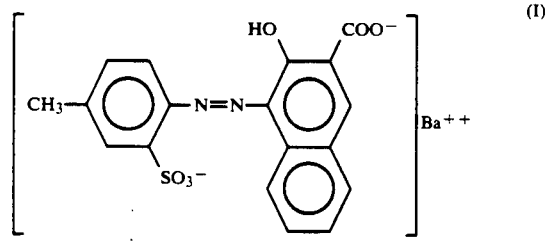
(I)

may be prepared by, for example, coupling a diazo component, which is obtained by diazotizing an amine of the following formula (II):

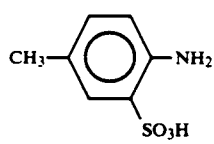
(II)

at a temperature of 5° C. or below, with a coupler component, which is obtained by dissolving an acid of the following formula (III):

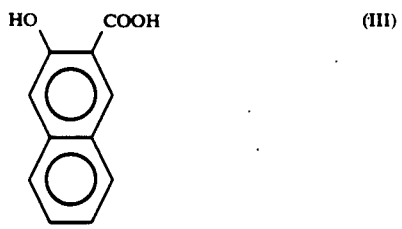
(III)

in an aqueous solution of a caustic alkali metal, at a temperature of 5° C. or below to thereby give a monoazo dye of the following formula (IV):

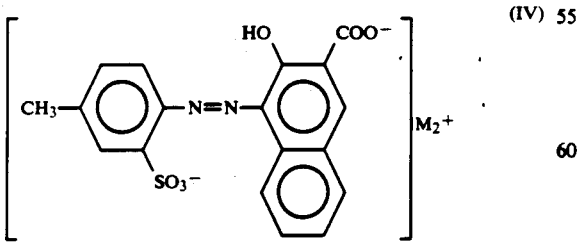
(IV)

wherein $M_2^+$ represents a sodium, potassium or lithium ion; and then laking the resulting monoazo dye (IV) by adding an aqueous solution of a barium salt to a suspension of said monoazo dye (IV) and then allowing the obtained mixture to react at a temperature of 5° C. or below.

An X-ray diffraction pattern of the conventional monoazo lake pigment of the formula (I) thus obtained shows a high diffraction intensity at a diffraction angle ($2\theta \pm 0.2°$; Cu-K$_\alpha$) of 4.9°; moderate diffraction intensity at 26.2°; and relatively low diffraction intensity at 14.8°.

However, the monoazo lake pigment having a crystal form of the above-mentioned X-ray diffraction pattern, which will be referred to as α form hereinafter, has not been marketed yet. This is because that it is inferior to a presently marketed calcium lake pigment known as C.I. Pigment Red 57:1 in brightness, color strength and gloss when used in a printing ink or a paint; and in fastness to heat when used in coloring plastics, although the former is superior to the latter in fastness to water.

SUMMARY OF THE INVENTION

In order to overcome these disadvantages, we have attempted to convert a monoazo dye of the formula (IV):

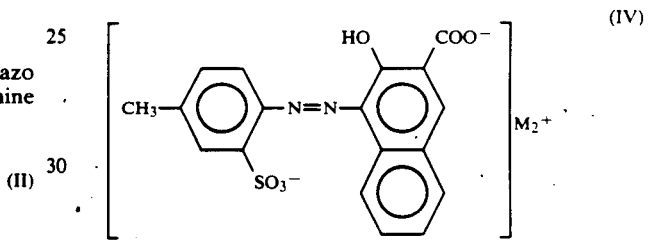
(IV)

wherein $M_2^+$ is as defined above; into a pigment. As a result, we have found that a pigment having a novel crystal form, which is excellent in various properties including brightness, color strength, gloss, fastness to water and fastness to heat and shows an X-ray diffraction pattern different from those of conventional α form pigments, can be obtained by heating said dye and then laking the same, thus completing the present invention.

Accordingly, the present invention relates to a monoazo lake pigment of the formula (I):

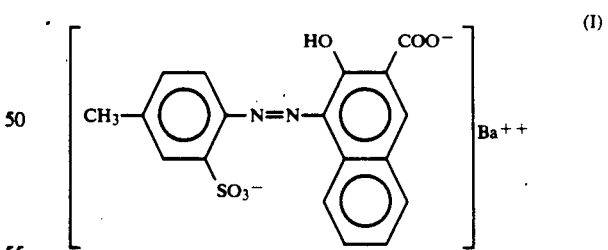
(I)

whose X-ray diffraction pattern shows a high diffraction intensity at a diffraction angle ($2\theta \pm 0.2°$; Cu-K$_\alpha$) of 5.0°; moderate diffraction intensities at 25.0°, 19.5°; and relatively low diffraction intensities at 14.8°.

DETAILED DESCRIPTION OF THE INVENTION

Figure 1:
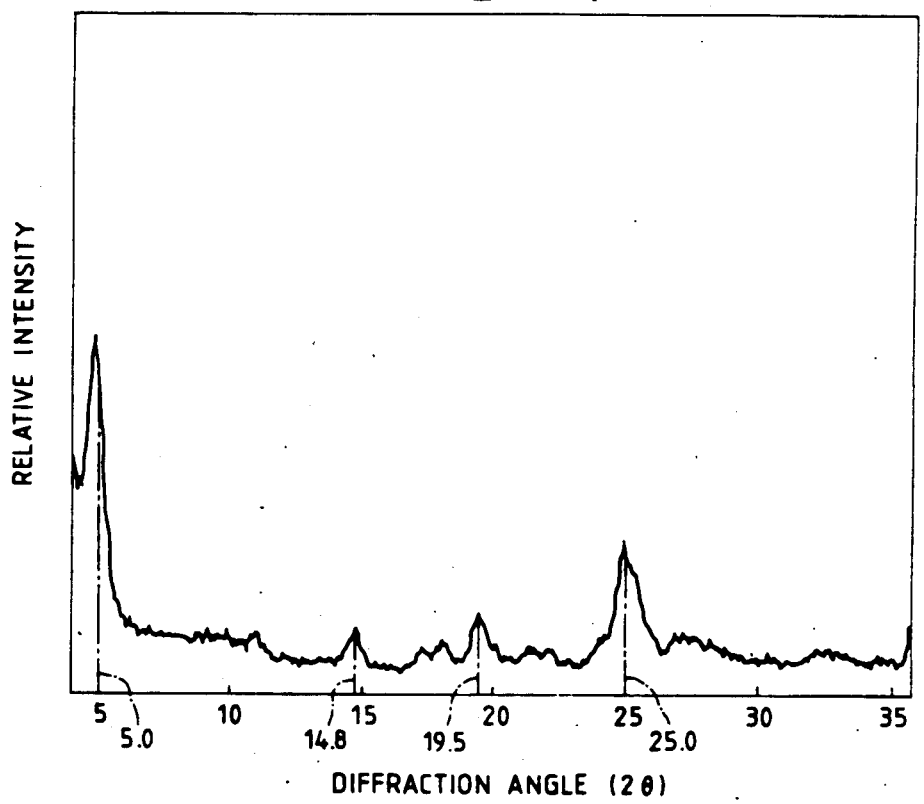
FIG. 1 is an X-ray diffraction pattern ($2\theta \pm 0.2°$; Cu-K$_\alpha$) of the β form monoazo lake pigment of the present invention as obtained in Example 1.

The monoazo lake pigment of the present invention, whose crystal form, which will be referred to as β form hereinafter, shows an X-ray diffraction pattern completely different from those of conventional α form pigments as described above, may be obtained by, for example, heating a suspension of the monoazo dye of the formula (IV), which is obtained in a conventional manner, usually to a temperature of 20° to 45° C., adding an aqueous solution of a barium salt thereto and allowing the resulting mixture to react usually at a temperature of −3° to 45° C. to thereby laking the same. A particularly preferable process comprises heating said suspension in such a manner as to maintain the same at a temperature of 23° to 40° C. for 2 to 20 minutes, then adding an aqueous solution of a barium salt thereto and allowing the resulting mixture to react at 0° to 40° C., since a β form pigment is excellent in, for example, brightness, color strength and gloss can be efficiently obtained thereby.

Examples of the barium salt to be used in the laking step of the present invention include barium chloride, barium nitrate and barium acetate.

When used in, for example, printing inks or paints, the novel β form red monoazo lake pigment of the present invention exhibits an excellent brightness, color strength and gloss and is highly fast to water. Further, it is highly fast to heat when employed in coloring plastics.

To further illustrate the present invention, and not by way of limitation, the following examples will be given, wherein all parts and percentages are expressed by weight.

EXAMPLE 1

20.0 parts of 2-amino-5-methylbenzenesulfonic acid was dispersed in 200 parts of water and 22.0 parts of a 20% aqueous solution of hydrochloric acid was added thereto. The resulting mixture was diazotized by adding 25.1 parts of a 30% aqueous solution of sodium nitrite dropwise thereto while maintaining the resulting mixture at 0° C. to thereby give a diazo solution.

Then, 20.6 parts of 2-hydroxy-3-naphthoic acid was dispersed in 242 parts of water at 60° C. and 22.0 parts of a 48% aqueous solution of caustic soda was added thereto to thereby dissolve said acid. The coupler solution thus obtained was cooled to 0° C. and the above-mentioned diazo solution was added dropwise thereto under stirring. The resulting mixture was stirred at 0° C. for 60 minutes to thereby complete the coupling. Subsequently, 60 parts of a 10% aqueous solution of sodium rosinate was added thereto and the obtained mixture was stirred for 60 minutes to thereby give a suspension of a monoazo dye.

This dye suspension was heated to 27° C. within 14 minutes and then maintained at this temperature for 10 minutes. Subsequently, a solution obtained by dissolving 38.6 parts of barium chloride hydride in 150 parts of water was added thereto and the resulting mixture was stirred at 27° C. for 60 minutes. After adjusting the pH value to 7.6, the mixture was stirred for additional 60 minutes to thereby give a lake product. After the completion of the laking, the reaction mixture was stirred at 80° C. for 60 minutes, hot-filtered, washed with water and then dried at 80° C. Thus, 60.0 parts of a yellowish red monoazo lake pigment was obtained in the form of a powder.

As shown in FIG. 1, an X-ray diffraction pattern of this pigment showed a high diffraction intensity at a diffraction angle ($2\theta \pm 0.2°$; Cu-K$_\alpha$) of 5.0°, moderate diffraction intensities at 25.0° and relatively low diffraction intensities at 14.8°, 19.5°.

Figure 3:
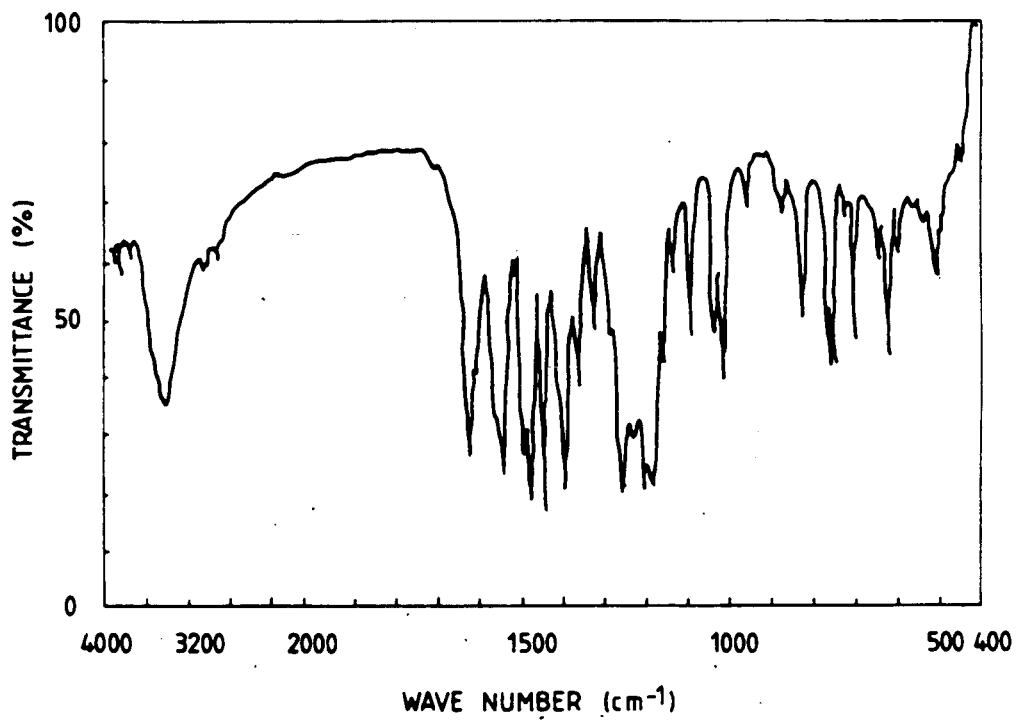
FIG. 3 is an infrared absorption spectrum of the β form monoazo lake pigment of the present invention as obtained in Example 1.

FIG. 3 shows an infrared absorption spectrum of this pigment.

EXAMPLE 2

The procedure of Example 1 was followed except the following points. Namely, a dye suspension, which was obtained through a diazo coupling reaction similar to the one as described in Example 1, was heated to 37° C. within 19 minutes and then maintained at this temperature for 5 minutes. Subsequently, it was cooled again to 10° C. and a solution of 43.2 parts of barium acetate in 200 parts of water was added thereto. The resulting mixture was stirred at 10° C. for 60 minutes. After adjusting the pH value to 7.6, it was further stirred for additional 60 minutes to thereby complete the laking. Thus, 59.9 parts of a yellowish red monoazo lake pigment was obtained in the form of a powder.

An X-ray diffraction pattern of this pigment was similar to that of the pigment as prepared in Example 1.

Comparative Example 1

The procedure of Example 1 was followed except the following points. Namely, a dye suspension which was obtained through a diazo coupling reaction similar to the one as described in Example 1 was employed without heating. A solution of 38.6 parts of barium chloride hydrate in 150 parts of water was added thereto and the resulting mixture was stirred at 0° C. for 60 minutes. After adjusting the pH value to 7.6, the mixture was further stirred for additional 60 minutes to thereby complete the laking. Thus, 61.1 parts of a yellowish red monoazo lake pigment was obtained in the form of a powder.

Figure 2:
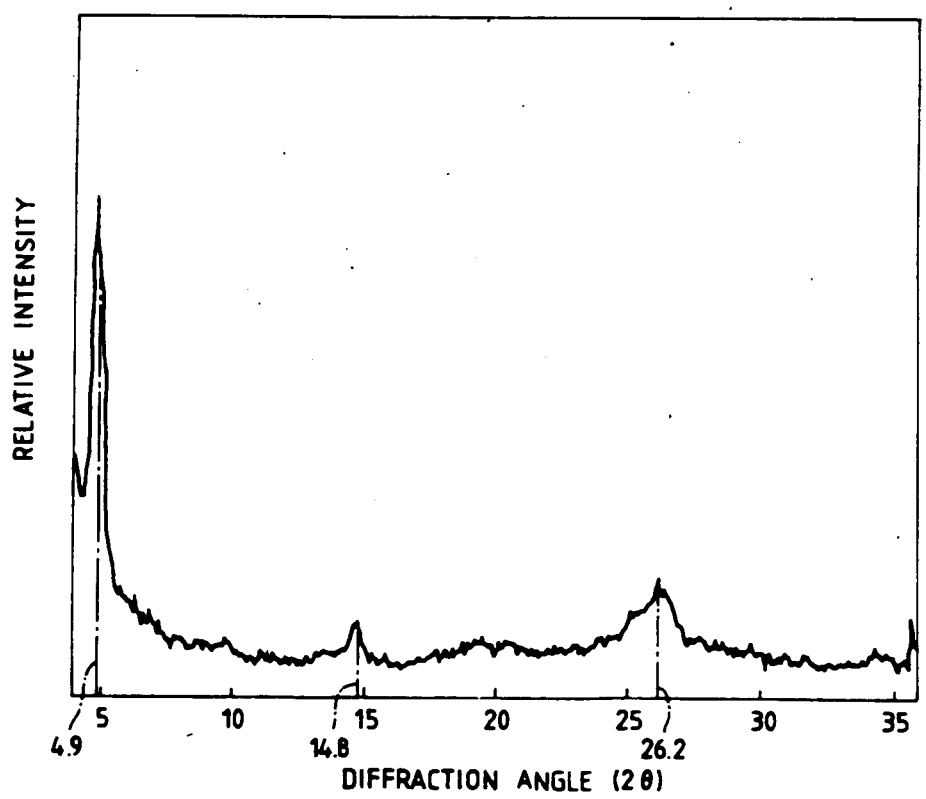
FIG. 2 is an X-ray diffraction pattern ($2\theta \pm 0.2°$; Cu-K$_\alpha$) of the conventional form monoazo lake pigment as obtained in Comparative Example 1.

As shown in FIG. 2, an X-ray diffraction pattern of this pigment showed a high diffraction intensity at a diffraction angle ($2\theta \pm 0.2°$; Cu-K$_\alpha$) of 4.9°, moderate diffraction intensity at 26.2° and relatively low diffraction intensity at 14.8°.

Figure 4:
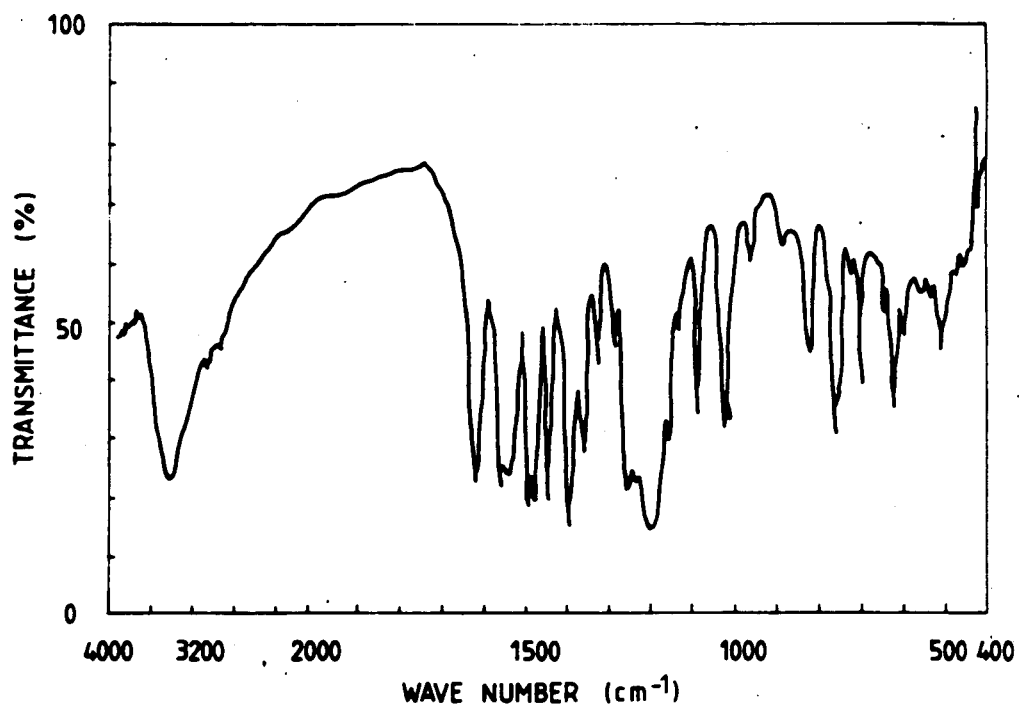
FIG. 4 is an infrared absorption spectrum of the conventional α form monoazo lake pigment as obtained in Comparative Example 1.

FIG. 4 shows an infrared absorption spectrum of this pigment.

Test Example 1: Print Test on Litho Printing Ink 4.0 parts of a pigment obtained in one of Examples 1 to 2 or Comparative Example 1 was milled together with 16.0 parts of ink varnish in a Hoover Automatic muller mixer by repeating three times of 100 revolution mixing to thereby give an ink. The obtained ink was printed on a sheet of coated paper with the use of a small-scale rotary press (RI tester). The chroma (C*), gloss (60°) and density of the paper thus colored were measured with a spectrophotometer, a glossmeter and a Gretag densitometer (reflection densitometer) respectively. Table 1 shows the results.

TABLE 1

|  | Chroma (C*) | Gloss (60°) | Gretag Density |
|---|---|---|---|
| Example 1 | 65.1 | 78.3 | 1.27 |
| Example 2 | 65.0 | 76.4 | 1.25 |
| Comparative Example 1 | 49.1 | 46.8 | 0.76 |

The inks comprising the pigments of Examples 1 to 2 showed each a high chroma, an excellent gloss and a high density.

Test Example 2: Test on Paint 12 parts of a pigment obtained in one of Examples 1 to 2 or Comparative Example 1, 52 parts of a melamine alkyd resin having a weight ratio of melamine resin to alkyd resin of 3:7, 52 parts of xylene and 120 parts of glass beads were introduced into a polyethylene bottle. The mixture was dispersed with the use of a paint conditioner for 1 hour and then additional 50 parts of the melamine alkyd resin was added thereto. The resulting mixture was further dispersed for 10 minutes with the paint conditioner. Then, the glass beads were filtered off to thereby give a red paint. This paint was spray-baked onto a plate and the gloss of the film was measured with a glossmeter. Table 2 shows the results.

TABLE 2

|  | Gloss (60°) |
|---|---|
| Example 1 | 89 |
| Example 2 | 87 |
| Comparative Example 1 | 39 |

The paints comprising the pigments of Examples 1 to 2 showed each an excellent gloss.

Test Example 3: Test on Fastness to Water 12 parts of a pigment as obtained in one of Examples 1 to 2 or Comparative Example 1 or a commercially available calcium lake pigment (C.I. Pigment Red 57:1), 84 parts of a urethane resin, 12 parts of methyl ethyl ketone and 150 parts of steel beads were introduced into a polyethylene bottle. The mixture was dispersed with a paint conditioner for 1 hour. Then, the steel beads were filtered off to thereby give a red ink. This red ink was drawn down on a sheet of nylon film with a 0.15 mm bar coater. Then, a filter paper was placed onto the colored face of the film and the composite sheet thus formed was sandwiched between two aluminum plates and clipped. After boiling in water for 1 hour, the filter paper was peeled off and the degree of the migration of the pigment thereto was determined by measuring the density with a Gretag densitometer. Table 3 shows the results.

TABLE 3

|  | Gretag Density |
|---|---|
| Example 1 | 0.01 |
| Example 2 | 0.02 |
| Comparative Example 1 | 0.01 |
| C.I. Pigment Red 57:1 | 0.44 |

The inks comprising the pigments of Examples 1 to 2 and Comparative Example 1 were superior to the C.I. Pigment Red 57:1 in fastness to water.

Test Example 4: Test on Fastness to Heat

A dry color comprising six parts of a pigment as obtained in one of Examples 1 to 2 or Comparative Example 1 and 2 parts of zinc stearate was blended with 1,200 parts of polypropylene. With the use of the resulting blend, a lithograph was formed with an in-line screw injection molding machine (3 ounces) at a molding temperature of 280° C. and at a residence time of 0 to 20 minutes. Then, the fastness to heat of each pigment was evaluated by measuring the color difference ($\Delta E$). Table 4 shows the results.

TABLE 4

|  | Color Difference ($\Delta E$) |
|---|---|
| Example 1 | 0.8 |
| Example 2 | 0.8 |
| Comparative Example 1 | 2.5 |

The lithographs colored with the pigments as obtained in Examples 1 to 2 showed each a small color difference and a bright red color and was highly fast to heat.

While the invention has been described in detail and with reference to specific embodiments thereof, it will be apparent to one skilled in the art that various changes and modifications can be made therein without departing from the spirit and scope thereof.

What is claimed is:

1. A monoazo lake pigment of the formula (I):

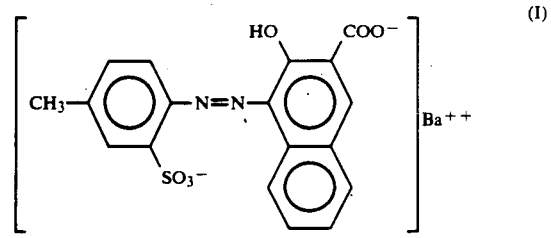

whose X-ray diffraction pattern shows a high diffraction intensity at a diffraction angle ($2\theta \pm 0.2°$; Cu-K$_\alpha$) of 5.0°, moderate diffraction intensity at 25.0°, and relatively low diffraction intensities at 14.8°, 19.5°.

2. A monoazo lake pigment according to claim 1 which is obtained by heating a monoazo dye of formula (IV):

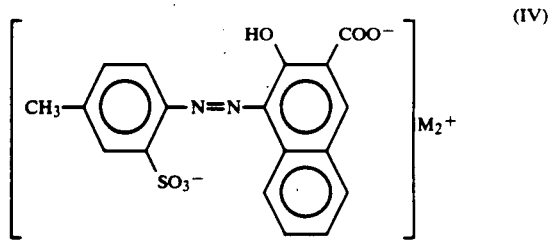

wherein M$_2^+$ represents a sodium, potassium or lithium ion; and adding an aqueous solution of a barium salt thereto, and allowing the resulting mixture to react thus laking the same.

3. A monoazo lake pigment according to claim 2, wherein a monoazo dye of the formula (IV) is heated at a temperature of 20° to 45° C., and a mixture of said monoazo dye and an aqueous solution of a barium salt is reacted at a temperature of −3° to 45° C.

4. A monoazo lake pigment according to claim 2, wherein a monoazo dye of the formula (IV) is heated and further maintained at a temperature of 23° to 40° C. for 2 to 20 minutes, and a mixture of said monoazo dye and an aqueous solution of a barium salt is reacted at a temperature of 0° to 40° C.

* * * * *

UNITED STATES PATENT AND TRADEMARK OFFICE
CERTIFICATE OF CORRECTION

PATENT NO. : 5,055,564

DATED : October 8, 1991

INVENTOR(S) : Nagatoshi KOBAYASHI et al

It is certified that error appears in the above-identified patent and that said Letters Patent is hereby corrected as shown below:

On the title page:   Item [75], "Nagatoshi Koyayashi; Hirohito Ando," should read --Nagatoshi Kobayashi; Hirohito Ando,--.

Signed and Sealed this

Sixteenth Day of March, 1993

Attest:

STEPHEN G. KUNIN

Attesting Officer

Acting Commissioner of Patents and Trademarks